2,800,037

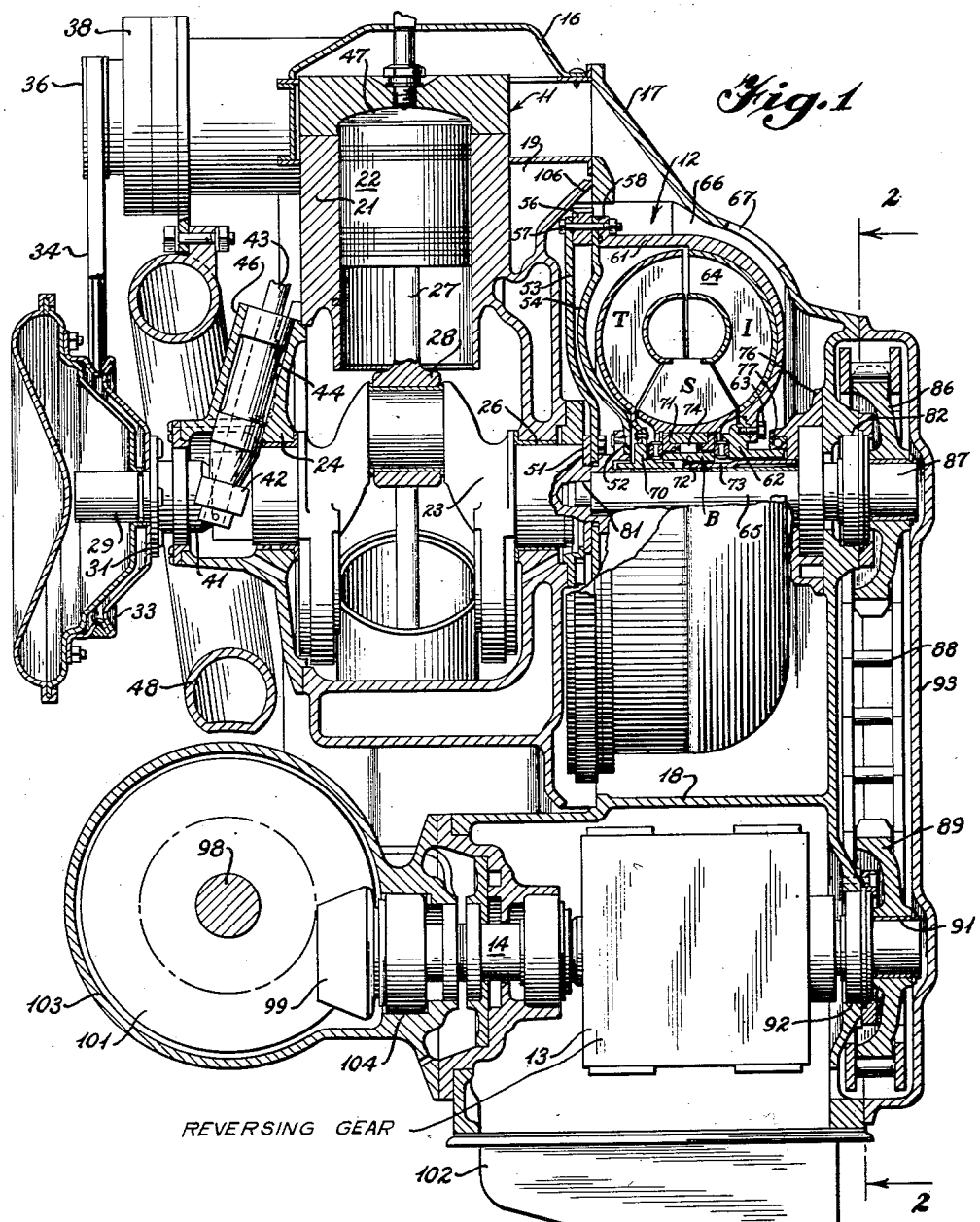

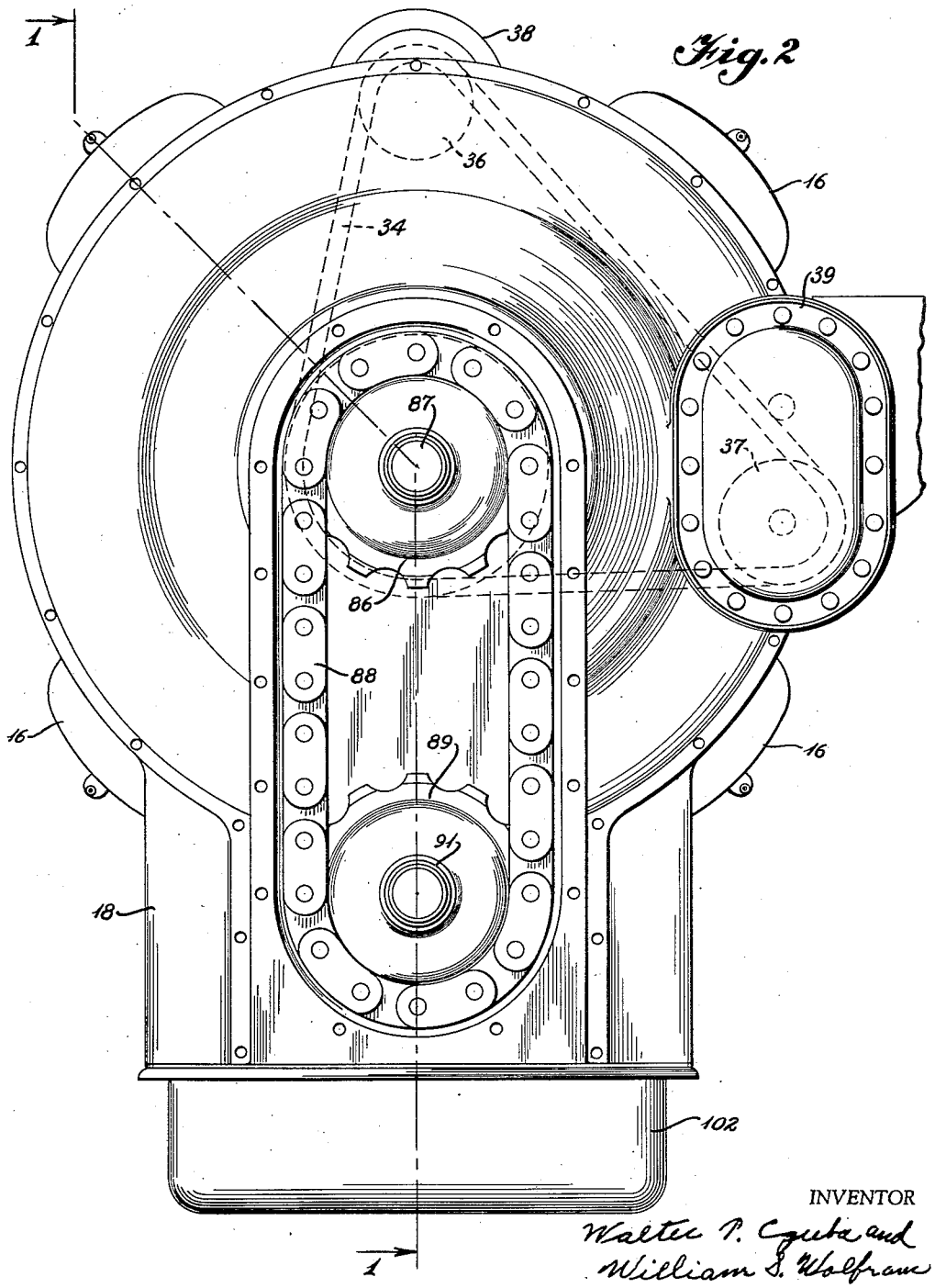

AUTOMOTIVE POWER PLANT

Walter T. Czuba, Detroit, and William S. Wolfram, Birmingham, Mich., assignors to General Motors Corporation, Detroit, Mich., a corporation of Delaware Application January 31, 1955, Serial No. 485,113

11 Claims. (Cl. 74—730)

The present invention relates to a compact automotive power plant particularly designed for small automobile application and which power plant includes an engine and a torque multiplying device. More particularly, the present power plant includes a radial engine and a fluid torque converter intimately connected therewith.

One of the main obstacles to be overcome in producing a satisfactory small or light-weight type automobile is the development of a compact and light-weight power plant. In a small size automobile the problem of space is acute, thus the need for a small power plant has been accompanied by the need for such a plant which is easily removable as a unit from the vehicle in order to permit ready servicing.

It is the purpose of the present invention, therefore, to provide a compact power plant that is conveniently removable as a unit from the vehicle. In achieving the broad purpose of this invention, it has been found that the present automotive engines, whether of the V or in-line type, are totally unsatisfactory for the small type power plant due to their relatively large longitudinal displacement. Accordingly, it is proposed that the engine of the subject power plant be of the radial type, which in addition to having a small longitudinal displacement, has other inherent advantages in small power plant uses. In order further to limit the longitudinal displacement of the engine, it is proposed to use a fluid torque converter in place of the normal mechanical gear train. Thus, insofar as providing power to drive a vehicle in one direction is concerned, the need is met by the engine and converter alone. However, in order to provide for reversing the direction of vehicle travel, the power plant also utilizes a simple reversing mechanism which may be uniquely disposed with respect to the engine and converter so as not to increase the longitudinal displacement of the power plant.

In the drawings:

Figure 1 is a partially sectioned elevational view of one form of power plant embodying the invention.

Figure 2 is an end view along line 2—2 of Figure 1.

In Figure 1, there is shown an engine 11, a torque converter 12, a reversing device 13, and a propeller shaft 14. Surrounding the engine is a casing 16 which abuts and is rigidly connected to a casing 17 surrounding the torque converter. The torque converter casing 17 extends downwardly to provide a casing 18 for the reversing means and the propeller shaft.

The engine 11, as shown, is preferably a four cylinder, two cycle type which provides an inexpensive light-weight source of prime mover energy. The engine includes a cylinder block 19 having a plurality of cylinders 21 and pistons 22 adapted to reciprocate therewithin. A crankshaft 23 is mounted within the cylinder block on bearings 24 and 26. The pistons 22 are connected to the crankshaft through connecting rods 27 by any convenient type of multiple throw connecting means 28.

Projecting forwardly from the crankshaft 23 is an accessory drive shaft 29. On shaft 29 there is provided a flange 31 which is bolted through studs 32 to a pulley member 33. A belt drive 34 transmits the drive from pulley 33 to corresponding pulleys such as 36 and 37 in order to drive any accessories such as a generator 38 and an oil separator 39.

A gear member 41 is affixed to the accessory shaft 29 and is adapted to drive a corresponding gear member 42 on a power take-off shaft 43. The power take-off shaft 43 is mounted in a bearing 44 disposed in an extension 46 of the engine block 19. The power take-off shaft 43 may be utilized to actuate a plurality of fuel injection devices, not shown, and which devices supply combustible charges to the respective combustion chambers 47.

An exhaust manifold 48 is suitably mounted on the engine block.

Crankshaft 23 delivers power to the torque converter 12 the latter which includes an impeller member I, a turbine member T and a stator or reaction member S. A pair of axially spaced flanges 51 and 52 formed on the crankshaft are bolted and riveted, respectively, to the radially inner ends of plate members 53 and 54. Disposed between the outer edges of members 53 and 54 is a timing gear 56 which along with the plate members is connected through bolts 57 to a radially extending flange 58 on an impeller shell 61.

The impeller shell 61 is rotatably supported at its inner end by a short coaxial shaft section 62 to which the shell is connected by studs 63. Impeller blades 64 are mounted on the inside of shell 61 while converter cooling fins 66 are mounted on the outside of the shell. Venting ports 67 are provided in torque converter casing 17 to permit fins 66 to circulate air about within the casing in order to dissipate the heat generated by the torque converter.

The turbine member T is connected to a converter output shaft 65 through a flanged sleeve 70 splined or otherwise connected to the output shaft.

A one-way brake B is disposed intermediate the stator S and the torque converter casing 17 and which brake prevents the reverse rotation of the stator when the torque converter is in a torque multiplying stage. The one-way brake B includes an outer race member 71 coupled for rotation with the stator, and an inner race member 72 splined to one end of a concentric sleeve 73. Conventional roller bearings 74 are mounted between the inner and outer races. The other end of sleeve 73 is rigidly fixed to casing 17 through a suitable collar member 76. Upon an attempt of the stator to rotate in the direction opposite to that of the impeller and turbine member, the one-way brake B will ground the stator S to the transmission casing permitting the stator to free wheel with the impeller and turbine, however, when torque multiplication is no longer necessary.

The impeller support sleeve 62 is concentrically mounted with respect to the torque converter output shaft 65 and rotates within a bearing 77 supported in collar 76.

One end of the torque converter output shaft is telescoped so as to be rotatively supported within a pilot bearing 81 in the crankshaft 23. In this way the cylinder block crankshaft bearing 26 also provides the support for one end of the torque converter output shaft further facilitating compacting and weight reduction of the power plant. The other end of shaft 65 is mounted in bearing 82 formed in the transmission casing and which bearing is axially aligned in spaced relation with crankshaft bearing 26.

In order that reversing mechanism 13 and propeller shaft 14 may be disposed so as not to increase the longitudinal displacement of the power plant, they are respectively disposed below the torque converter 12 and the engine 11. While it might be expedient to relate them otherwise under certain conditions, the rotative axis of the engine and converter is normally parallel to the axis of the reversing mechanism and propeller shaft.

It is necessary, therefore, that the drive from the torque converter output shaft 65 be translated downwardly and forwardly to the reversing means 13. As a result, the longitudinal direction of power flow is transposed through 180° in proceeding from the engine 11 to the propeller shaft 14. A sprocket or gear 86 is mounted on a portion 87 of the torque converter output shaft 65 which is extended outwardly from the transmission casing bearing 82. The sprocket 86 is thus cantilever supported upon casing 82. A silent chain drive member 88 transmits the drive from sprocket 86 to a similarly mounted sprocket 89 mounted on a shaft 91 which is the power input member for the reversing means 13. Input shaft 91 is rotatably supported in a bearing 92 mounted in casing 18.

A cover plate 93 is provided to enclose the chain drive 88 as well as sprockets 86 and 89. The plate 93 is removably secured to the transmission casing 17 in any convenient manner.

The reversing means 13 may be any type of mechanism suitable for reversing the direction of rotation of output or propeller shaft 14. By means of this reversing device the propeller shaft may either rotate in the same direction as the torque converter and engine, or in the reverse direction depending on the selective actuation of the reversing device. While the particular type of reversing means is not limited, it is suggested that a planetary type gear set would be readily adaptable for such use. A planetary type gear set has among its advantages quietness and simplicity of operation as well as having a very small longitudinal displacement. This latter feature of a planetary gear set is a characteristic in common with the instant engine and torque converter. It is possible, however, to use a slider or counter-shaft type reversing mechanism, if such should be preferred.

The propeller shaft 14 is connected to the output side of the reversing device 13 by any suitable means. Assuming a planetary reversing gear set is used the propeller shaft could be directly coupled to the output member of the gear set. The propeller shaft 14, in this case, is relatively short and is supported at one end in a bearing member 96 disposed in a bearing plate 97. Bearing plate 97 is preferably removably mounted in casing 18 but may also be formed as an integral part thereof assuming internal access to the casing is provided in some other way.

In the event the vehicle driving axles 98 are to be located adjacent the power plant, as is shown in Fig. 1, a pinion or hypoid type gear 99 may be mounted on the other end of the propeller shaft 14. The pinion gear is adapted to mesh with differential ring gears 101, which would in turn transmit drive in the conventional manner to the driving axles 98.

A removable oil pan 102 is secured to the bottom of the casing to provide a reservoir of lubricating oil. Inasmuch as it forms no direct part of the subject invention no pump means for delivering oil to the various parts to be lubricated has been shown. It is understood, however, that the power to drive such a pump may be tapped off the power train at any convenient point. In accordance with common practice such a pump is normally designed to provide lubricant for all of the wear surfaces, including the bearings, and pistons.

Inasmuch as the oil used in the torque converter is different from that used for general lubrication it is usually necessary to provide a separate pump and crankcase for the transmission oil.

A differential casing 103 is adapted to enclose axles 98, ring gear 101 and pinion gear 99. In this case a bearing member 104 is provided in the differential casing to support the other end of the propeller shaft 14.

The use of radial engines particularly in small automobiles is not new. Significantly, however, it is the unique combination of a radial engine with a fluid torque converter that has resulted in a compact, inexpensive and adequately powered power plant.

Due to the inherent construction of a radial engine in general, and engine 11 in particular, a crankshaft 23 centrally disposed with respect to the radial cylinders makes it possible to mount the torque converter and engine concentrically. In this way the diameter of the torque converter may approach that of the radial engine without in any way increasing the vertical displacement of the power plant.

To the contrary, in a V or in-line type engine the crankshaft is vertically off-center being normally found near the bottom of the engine. In connecting a torque converter to such a crankshaft a large part of the torque converter projects below the engine proper and frequently adds to the overall vertical displacement of the engine. The vertical stowage space that the power plant will require within the automobile, in such case, is directly dependent on the diametrical size of the torque converter.

The radial engine-fluid torque converter power plant is thus superior stowagewise to the corresponding V or in-line type power plants due to the former's reduced longitudinal and vertical displacement.

In the subject power plant there is a further important advantage realized in mounting the torque converter 12 concentrically with respect to engine 11. In this regard, mounting the torque converter immediately adjacent the engine enables the proximate portion 106 of the engine block to be utilized to form a part of the housing or casing for the torque converter. Thus casing 17 and that portion 106 of the engine block cooperate to provide an enclosure for the torque converter. Utilizing the engine block in this way eliminates the traditional transmission bell housing which normally provides part of a torque converter casing. By eliminating the transmission bell housing, the longitudinal displacement and the weight of the power plant are further reduced.

Inasmuch as cost is a particularly important factor in providing a small automobile power plant, it has already been noted that engine 11 is of the four cylinder-two cycle type. This type engine is relatively inexpensive and light-weight because of the small number of cylinders and the fewer number of working parts per cylinder. The disadvantage of such an engine, as used in the prior art, however, is that it is low powered and accordingly vehicle performance in what may be called the low speed or high power demand range has usually been wanting.

In the instant power plant the low torque output of engine 11 is supplemented by the use of an extra large fluid torque converter. Due to the concentric relationship between the torque converter 12 and engine 11, as already described, the size torque converter which may be used without increasing the vertical displacement of the power plant is determined in the main by the engine diameter and hence the inherent disadvantages of the engine itself may be overcome. To illustrate the importance of this relationship, consider that an average automobile having a V or in-line type engine uses a torque converter having a 12 to 14 inch diameter and which size is determined in a large measure by necessary road clearance. In other words, in this type of automobile power plant each additional inch of torque converter size increase usually results in a corresponding decrease in road clearance. In the subject power plant the diameter of the engine is approximately 24 inches. Accordingly, a torque converter having a diameter of up to 24 inches, or almost twice the size currently in use, may be employed in the present power plant. While the size of the torque converter may vary under different conditions, it is apparent that a torque converter of larger than normal capacity may be used to enhance the normally low torque output of the low powered engine. In this way the acceleration and power characteristics of a vehicle using a relatively small engine may be considerably improved.

The small amount of space which may be devoted to storing a power plant in a small vehicle makes it extremely inconvenient to repair, in situ, the power plant components such as engine, torque converter and propeller shaft. Thus one of the primary objects of the present engine has not only been to develop the compact power plant as described, but also to construct the power plant in such a way that it is easily removable as a unit from the vehicle. This unitary construction has been achieved by intimately connecting the torque converter 12 to the engine 11 through casing 17, further by making this casing of a size sufficient to provide an integrally related casing 18 for housing the reversing mechanism 13 and the propeller shaft 14. By this unique construction the power plant seen in Figure 1, exclusive of the differential, differential casing and axles, may be removed as a unit from the vehicle to facilitate ready repair.

It is apparent that having taught the basic concept of combining a radial engine with a torque converter to provide a compact light-weight power plant as well as disclosing a preferred embodiment thereof further structural variations of the power plant are yet possible. It is not intended, therefore, to limit the scope of the present invention to the specific or preferred embodiment set forth in the drawings.

What is claimed is:

1. A vehicle power plant including in combination a radial engine having a crankshaft; a fluid torque converter mounted adjacent said engine, said converter including an input member and an output member; means connecting said input member to said crankshaft; a converter output shaft connected to said output member; a driven shaft; means connecting said driven shaft and said converter output shaft; and means associated with said driven shaft to selectively reverse the rotation of said shaft, said driven shaft and associated means being disposed directly below said engine and torque converter and substantially longitudinally coextensive therewith.

2. A vehicle power plant including in combination a radial engine having a crankshaft and a cylinder block; a fluid torque converter; a housing for said torque converter, said torque converter being mounted adjacent said engine so that said cylinder block forms a part of said housing, said converter including an input member and an output member; means connecting said input member to said crankshaft; a converter output shaft connected to said output member; a driven shaft; means connecting said driven shaft and said converter output shaft; and means associated with said driven shaft to selectively reverse the rotation of said shaft, said driven shaft and associated means being disposed directly below said engine and torque converter and substantially longitudinally coextensive therewith.

3. A vehicle power plant including in combination a radial engine comprising a cylinder block, a crankshaft rotatively supported within said cylinder block, and a casing; a fluid torque converter, said torque converter being mounted adjacent said engine so that said cylinder block and said engine casing form a housing for said torque converter, said converter including an input member and an output member, means connecting said input member to said crankshaft, a converter output shaft connected to said output member; a driven shaft; means connecting said driven shaft and said converter output shaft; and means associated with said driven shaft to selectively reverse the rotation of said shaft, said driven shaft and associated means being disposed below said engine and torque converter.

4. A vehicle power plant including in combination a radial engine comprising a cylinder block, a crankshaft rotatively supported within said cylinder block, and a casing; a fluid torque converter, said torque converter being mounted adjacent said engine so that said cylinder block and said casing form a housing for said torque converter, said converter including an input member and an output member; means connecting said input member to said crankshaft, a bearing member in said casing; a converter output shaft connected to said output member, a pilot bearing in said crankshaft, one end of said converter output shaft being supported in said pilot bearing, the other end of said output shaft being supported in said casing bearing; a driven shaft; means drivingly connecting said driven shaft and said converter output shaft; and means associated with said driven shaft to selectively reverse the rotation of said shaft, said driven shaft and associated means being disposed below said engine and torque converter.

5. A vehicle power plant comprising a radial engine having a crankshaft a fluid torque converter the rotative axes of said torque converter and said crankshaft being coaxial, means connecting said engine and torque converter in driving and driven relation, a driven shaft, reversing means operatively connected with said shaft and adapted to selectively reverse the direction of rotation of said shaft, said driven shaft and said reversing means being disposed below said engine and torque converter, and means drivingly connecting said torque converter to said reversing means, said power plant being so constructed and arranged that the longitudinal direction of power flow through said engine and torque converter is opposite to that through said driven shaft and said reversing means.

6. A vehicle power plant including in combination a radial engine comprising a cylinder block, a crankshaft rotatably supported in said cylinder block; a fluid torque converter, a casing for said torque converter; means for mounting said torque converter adjacent said engine so that the rotative axes of the converter and crankshaft are coaxial and further that the cylinder block forms a part of said casing, said torque converter having an impeller member, a turbine member, a stator member and an output shaft; means connecting said crankshaft to said impeller member; means connecting said turbine member to said output shaft; and a one-way brake device connected intermediate said stator and said casing to ground said stator member against rotation in one direction.

7. A vehicle power plant including in combination a radial engine comprising a cylinder block, a crankshaft rotatably supported in said cylinder block; a fluid torque converter, a casing for said torque converter, means for mounting said torque converter adjacent said engine so that the rotative axes of the converter and crankshaft are coaxial and further said cylinder block forms a part of said casing, said torque converter having an impeller member, a turbine member, a stator member and an output shaft, a pilot bearing in said crankshaft adjacent said torque converter, a bearing member in said casing in axially spaced alignment with said pilot bearing, the respective ends of said output shaft being supported in said pilot bearing and said casing bearing; means connecting said crankshaft to said impeller member; means connecting said turbine member to said output shaft; and a one-way brake device connected intermediate said stator and said casing to ground said stator member against rotation in one direction.

8. A vehicle power plant comprising a radial engine having an engine crankshaft; a fluid torque converter mounted adjacent said engine, said converter including an input member and an output member; means connecting said input member to said crankshaft, a converter output shaft connected to said output member; a driven shaft; means connecting said driven shaft and said converter output shaft; and means associated with said driven shaft to selectively reverse the rotation of said shaft.

9. A vehicle power plant including in combination a radial engine comprising an engine crankshaft and a cylinder block; a fluid torque converter, a housing for said torque converter, said torque converter being mounted adjacent said engine so that the rotative axes of the converter and crankshaft are coaxial and further said cylinder block forms a part of said housing, said converter including an input member and an output member; means connecting said input member to said crankshaft, a converter output shaft connected to said output member; a driven shaft; means connecting said driven shaft and said converter output shaft; and means associated with said driven shaft for selectively reversing the rotation of said shaft.

10. A vehicle power plant comprising a radial engine having a crankshaft a fluid torque converter, the rotative axes of the converter and crankshaft being coaxial, means connecting said engine and torque converter in driving and driven relation, a driven shaft, shaft reversing means operatively connected with said shaft and adapted to selectively reverse the direction of rotation of said shaft, said driven shaft being disposed below said radial engine, said reversing means being disposed below said fluid torque converter, and means drivingly connecting said torque converter to said reversing means.

11. A vehicle power plant comprising an output shaft; a fluid torque converter disposed above said shaft and having an input member and an output member; means connecting said output member to said output shaft; said means including a device for reversing the direction of drive between said output member and said shaft, and a radial type engine having a crankshaft directly connected to the input member of said torque converter.

References Cited in the file of this patent

UNITED STATES PATENTS

| | | |
|---|---|---|
| 2,078,034 | Smith | Apr. 20, 1937 |
| 2,105,742 | Lee | Jan. 18, 1938 |
| 2,163,476 | Vincent | June 20, 1939 |
| 2,171,715 | Sinclair | Sept. 5, 1939 |